(12) United States Patent
Shiralkar et al.

(10) Patent No.: US 10,979,225 B1
(45) Date of Patent: Apr. 13, 2021

(54) SECURE AND ANONYMOUS ELECTRONIC POLLING

(71) Applicant: Amazon Technologies, Inc., Seattle, WA (US)

(72) Inventors: Trupti Shiralkar, Austin, TX (US); Joshua Stevens, Austin, TX (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 257 days.

(21) Appl. No.: 16/192,094

(22) Filed: Nov. 15, 2018

(51) Int. Cl.
*H04L 9/32* (2006.01)
*H04L 9/00* (2006.01)
*H04L 9/06* (2006.01)
*G07C 13/00* (2006.01)

(52) U.S. Cl.
CPC ............ *H04L 9/3213* (2013.01); *H04L 9/008* (2013.01); *H04L 9/0637* (2013.01); *H04L 9/3231* (2013.01); *H04L 9/3247* (2013.01); *G07C 13/00* (2013.01)

(58) Field of Classification Search
CPC ... H04L 9/3213; H04L 9/3231; H04L 9/0637; H04L 9/3247; H04L 9/008; G07C 13/00
See application file for complete search history.

(56) References Cited

U.S. PATENT DOCUMENTS

| 10,388,097 | B1* | 8/2019 | Ivanov | H04L 9/32 |
| 10,783,733 | B2* | 9/2020 | Unagami | G06Q 20/40 |
| 2019/0158272 | A1* | 5/2019 | Chopra | H04L 9/0637 |
| 2019/0371106 | A1* | 12/2019 | Kaye | H04L 9/3247 |
| 2020/0082126 | A1* | 3/2020 | Brown | H04N 21/4532 |
| 2020/0084039 | A1* | 3/2020 | Chabanne | G06F 12/0826 |
| 2020/0160641 | A1* | 5/2020 | Ruskin | H04L 9/3234 |
| 2020/0258338 | A1* | 8/2020 | Goswami | H04L 9/3247 |
| 2020/0266989 | A1* | 8/2020 | Krcmaricic-Barackov | H04L 9/30 |

OTHER PUBLICATIONS

R. Rivest Lecture Notes 15: Voting, Homomorphic Encryption (6.857 Computer and Network Security, Oct. 29, 2002).

* cited by examiner

*Primary Examiner* — Christopher A Revak
(74) *Attorney, Agent, or Firm* — Thomas Horstemeyer, LLP (57) ABSTRACT

Disclosed are various embodiments for secure and anonymized electronic voting. A homomorphically encrypted vote and a digital signature of the homomorphically encrypted vote are received from a client device. Then, the digital signature of the homomorphically encrypted vote is validated. Next, the homomorphically encrypted vote is stored in a data store in response to validating the digital signature of the homomorphically encrypted vote. Finally, the homomorphically encrypted vote is recorded in a publicly available distributed ledger.

20 Claims, 7 Drawing Sheets

SECURE AND ANONYMOUS ELECTRONIC POLLING

BACKGROUND

Voting is used for a variety of purposes. For example, consumer or customer polls may be used to identify popular products or product features. As another example, voting may be used to identify a most popular choice from a range of choices. For example, voting could be used to select a winning contestant in a performance or as a basis for providing an award to a candidate. Similarly, voting may be used to select policies or candidates at the ballot box.

BRIEF DESCRIPTION OF THE DRAWINGS

Many aspects of the present disclosure may be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for implementing secure and anonymous electronic voting. A user may register himself or herself in order to verify his or her eligibility to vote in a particular matter (e.g., a product survey or poll, to award an honor to an individual or organization, or in an election or referendum). Once registered, the user may then authenticate himself or herself during a voting window or period of time. The user may then use a client device (e.g., a mobile device, a personal computer, or another electronic device) to submit his or her vote in a secure and anonymized matter. To provide a digital audit trail, votes may be published to a publicly available distributed ledger, such as a blockchain.

In contrast to previous approaches to electronic voting, various embodiments of the present disclosure provide for a number of benefits. These include improved voter privacy by allowing for voters to vote without knowledge of their votes becoming public. Another benefit is identification and authentication, whereby eligible voters are identified correctly and voting is limited to eligible voters. Vote integrity is also maintained by preventing tampering of individual votes by third-parties. Various embodiments of the present disclosure also provide for non-repudiation, preventing voters from voting more than once or changing their vote once a vote is cast. Likewise, various embodiments of the present disclosure provide for an audit trail that allows for votes to be verified and confirmed in a secure manner while maintaining user privacy.

In the following discussion, a general description of the system and its components is provided, followed by a discussion of the operation of the same. It should be noted that while specific examples are discussed to illustrate the principles of the present disclosure, the present disclosure is not limited to the specific examples described herein.

Figure 1:
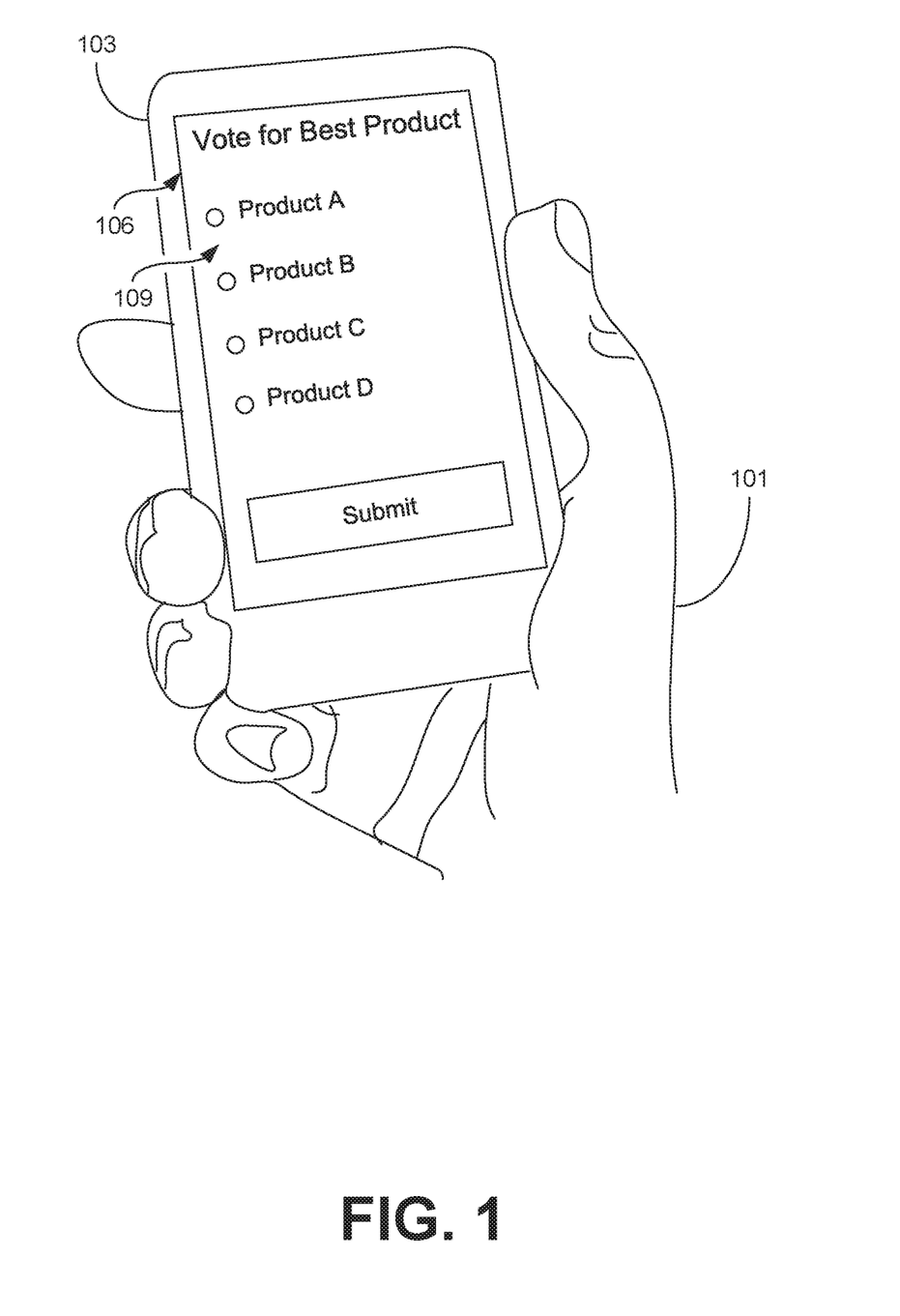
FIG. 1 is a drawing depicting one of several embodiments of the present disclosure.

As illustrated in FIG. 1, a user 101 is holding a client device 103. The client device 103 has a display 106. A graphical user interface 109 is rendered on the display 106 to provide the user 101 to select an option from a list of options as his or her vote. The user 101 may then submit his or her vote in a secure and anonymous manner by manipulating the graphical user interface 109.

Figure 2:
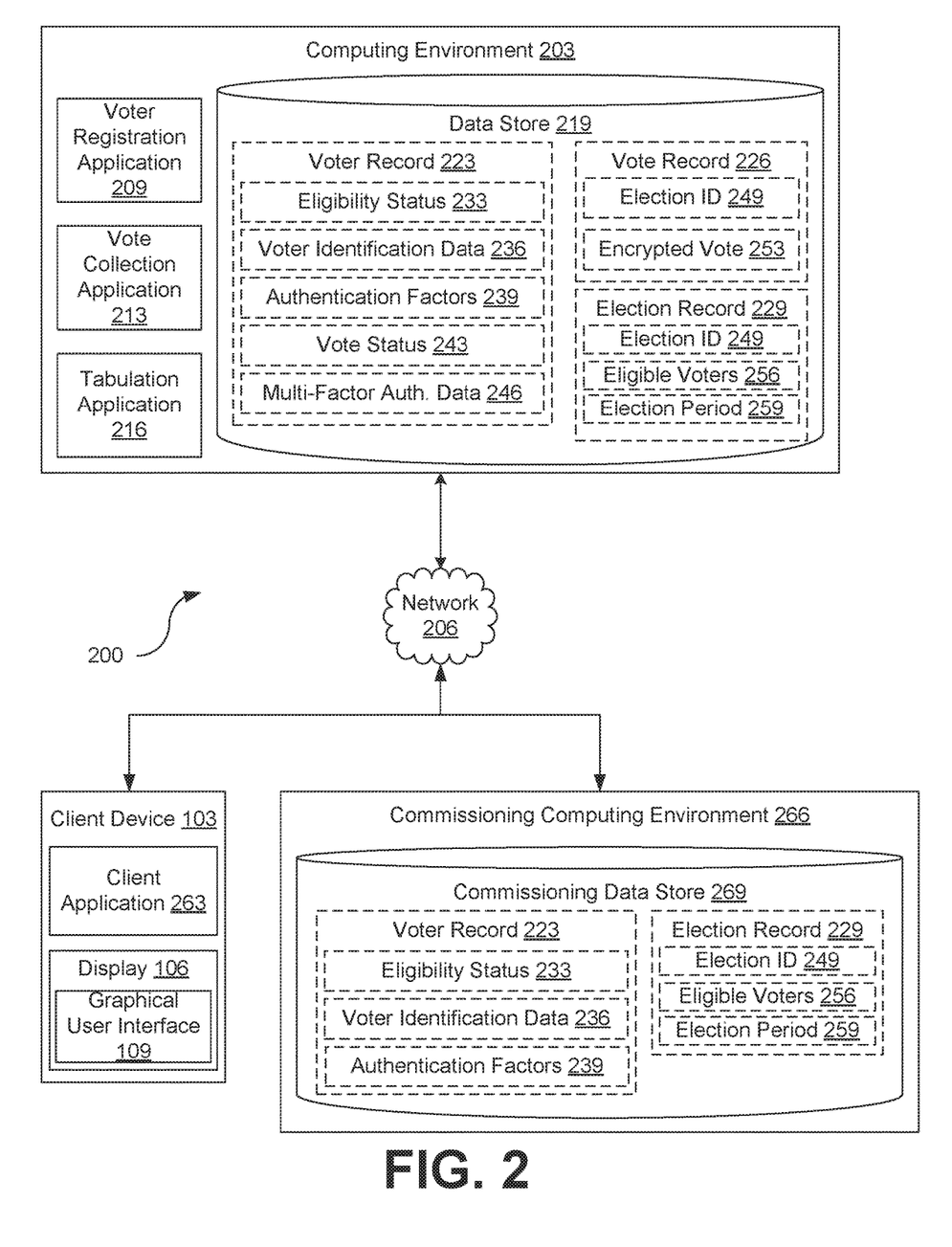
FIG. 2 is a drawing of a networked environment according to various embodiments of the present disclosure.

With reference to FIG. 2, shown is a networked environment 200 according to various embodiments. The networked environment 200 includes a computing environment 203 and a client device 103, which are in data communication with each other via a network 206. The network 206 includes wide area networks (WANs) and local area networks (LANs). These networks may include wired or wireless components or a combination thereof. Wired networks may include Ethernet networks, cable networks, fiber optic networks, and telephone networks such as dial-up, digital subscriber line (DSL), and integrated services digital network (ISDN) networks. Wireless networks may include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 206 may also include a combination of two or more networks 206. Examples of networks 206 may include the Internet, intranets, extranets, virtual private networks (VPNs), and similar networks.

The computing environment 203 may include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may include a hosted computing resource, a grid computing resource or any other distributed computing arrangement. In some cases, the computing environment 203 may correspond to an elastic computing resource where the allotted capacity of processing, network, storage, or other computing-related resources may vary over time.

Various applications or other functionality may be executed in the computing environment 203 according to various embodiments. The components executed on the computing environment 203, for example, include a voter registration application 209, a vote collection application 213, a tabulation application 216, and other applications, services, processes, systems, engines, or functionality not discussed in detail herein. Although the functionality of the voter registration application 209, vote collection application 213, and the tabulation application 216 are described separately for purposes of clarity, the functionality of the voter registration application 209, vote collection application 213, and the tabulation application 216 may be combined into a smaller number of applications or even a single application according to various embodiments of the present disclosure.

Also, various data is stored in a data store 219 that is accessible to the computing environment 203. The data store 219 may be representative of a plurality of data stores 219, which may include relational databases, object-oriented databases, hierarchical databases, hash tables or similar key-value data stores, as well as other data storage applications or data structures. The data stored in the data store 219 is associated with the operation of the various applications or functional entities described below. This data may include voter records 223, vote records 226, and election records 229, and potentially other data.

A voter record 223 is a data structure representing information associated with a user 101 who is a potential voter in one or more matters. A voter record 223 may include an eligibility status 233 of a user 101 to vote in a specific matter, voter identification data 236, biometric data 239, a vote status 243, and one or more authentication factors 239 that the user 101 may rely upon to authenticate himself or herself when submitting a vote.

The eligibility status 233 represents whether a particular user 101 is eligible to vote in particular matter. For example, voting in product surveys may be submitted to limited to owners or one or more relevant products being surveyed. As another example, voting to select a "best movie" or a "best album" may be limited to those users 101 who have viewed all of the candidate movies or own all of the candidate albums. Likewise, voting in a political election may be limited to those who live in a relevant geographic region or who have previously registered to vote in the political election. Moreover, some users 101 may be eligible to vote in multiple matters, but not be eligible to vote in others. For example, a user 101 who is domiciled in California and who has seen all of the nominated movies for "Best Picture" at the Academy Awards may be eligible to vote for a particular film to be "Best Picture" but ineligible to vote in an election for the Governor of Massachusetts. Accordingly, the eligibility status 233 of a voter record 223 may include an election identifier 249 for each matter in which a user 101 is eligible to cast a vote. In other implementations, the eligibility status 233 may include a list of election identifiers 249 and a Boolean value representing the eligibility of a user 101.

The eligibility status 233 of individual users 101 may be provided in advance by an entity that intends to use one or more embodiments of the present disclosure. In some instances, eligibility status 233 may be determined based on one or more predefined rules. For example, any user who submits proof of purchase of a product may be eligible to participate in a product survey. As another example of a predefined rule, any user 101 who lives in a particular geographic region may submit a vote in a relevant election. Similarly, a user who is currently in a particular location, as reported by his or her client device 103, may be eligible to vote in a matter. However, in some embodiments, a list of specific individuals and their eligibility status 233 may be provided by an entity that intends to use one or more embodiments of the present disclosure to facilitate voting in a particular matter.

The voter registration application 209 may verify the eligibility status 233 in some implementations. For example, the voter registration application 209 may confirm with a retailer or content provider that a user 101 has previously purchased a product that he or she is voting on. As another example, the voter registration application 209 may confirm voter information supplied by a client device 103 during a registration process with information stored in a voter record 223 located in the commissioning computing environment 266. If the information supplied by the user 101 matches that is stored in respective voter record 223 in the commissioning data store 269, then a voter may be presumed to be registered and eligible to vote.

The voter identification data 236 represents information that identifies a user 101 with respect to other users 101. For example, voter identification data 236 may include the legal name of a user 101, his or her date of birth, current place of residence, government-issued identification number (e.g., driver's license number, social security number, etc.), or similar uniquely identifying information. This information may be provided in advance by an entity that intends to use one or more embodiments of the present disclosure to facilitate voting in a particular matter. Moreover, this information may be retained with authorization of the user 101, which may be provided when a user 101 first interacts with an embodiment of the present disclosure.

The authentication factors 239 represent information that identifies a user 101. Examples of authentication factors 239 include passwords, access tokens, one-time passwords (e.g. time-limited one-time passwords, hash-based message authentication code (HMAC)-based one-time passwords, etc.), cryptographic certificates, and similar authentication mechanisms. Biometric data may optionally be used in those embodiments (e.g., elections in certain jurisdictions) where voting is restricted to specific individuals. In those embodiments, biometric data may be used to ensure that a user 101 of a client device 103 submitting an encrypted vote 253 is in fact an eligible user 101 instead of ineligible user 101 who happens to be in possession or have access to the client device 103 of the user. Examples of biometric data include fingerprints, face maps for facial recognition, iris prints, and similar data. Such biometric data may be obtained and stored with the consent of the user.

The vote status 243 is used to track whether a user 101 has previously submitted an encrypted vote 253 for a particular matter. In some instances, the vote status 243 may include an election identifier 249 for a specific election record 229 as well as a Boolean value indicating whether or not the user has voted.

The multi-factor authentication data 246 represent various mechanisms that a user 101 may provide to authenticate himself or herself and his or her client device 103 in order to submit an encrypted vote 253. In some instances, a user 101 may have to submit multiple authentication factors 239239 in order to verify his or her identity. Which authentication factors 239 or combination of authentication factors 239 that a user 101 is required to submit or has selected to submit may be stored as multi-factor authentication data 246.

A vote record 226 represents a vote submitted by a user 101. A vote record 226 may include an election identifier 249 identifying the matter in which the vote was cast. A vote record 226 can also include an encrypted vote 253 that was received from the client device 103 of the user 101. In order to preserve voter secrecy and anonymity, an association or link between a vote record 226 and a voter record 223 may be omitted from the data store 219. This prevents third-parties from determining which users 101 cast specific votes in a matter.

A vote may be stored in encrypted form as an encrypted vote 253 to further preserve voter anonymity and secrecy. In order to allow encrypted votes 253 to be tallied, the encrypted votes 253 may be encrypted using a homomorphic encryption scheme. In some instances, partially homomorphic encryption algorithms may be used, while other embodiments may use fully homomorphic encryption algorithms.

An encryption algorithm is homomorphic if it allows for computational operations to be performed on ciphertext data without requiring access to the plaintext version of the data. More formally, an encryption algorithm E( ) is homomorphic if, for the plaintext x and y and the resulting ciphertext E(x) and E(y), one may obtain $E(x \perp y)$ without knowledge of x or y for some operation $\perp$.

For example, the Rivest-Shamir-Adleman (RSA) encryption algorithm demonstrates multiplicative homomorphism. In RSA, given $c_i = m_i^e \mod(N)$, then $c_1 = m_1^e \mod(N)$ and $c_2 = m_2^e \mod(N)$. Therefore, $c_1 c_2 = m_1^e m_2^e \mod(N) = (m_1 m_2)^e \mod(N)$. An encryption algorithm that demonstrates homomorphism for any operation $\perp$ is considered to be homomorphic. Other examples of homomorphic encryption algorithms include the El-Gamal, Goldwassar-Micali, and Pailleir algorithms.

An election record 229 represents a matter for which votes are being cast by eligible users 101. Accordingly, an election record 229 may include an election identifier 249, a list of eligible voters 256, as well as an election period 259. The list of eligible voters 256 may include an identifier for each voter record 223 of a user 101 eligible to vote in the matter. However, in some embodiments, this information may also be determined by querying the eligibility status 233 of individual voter records to see which election records 229 are specified in the eligibility status 233 of individual voter records 223. The eligibility period 259 represents a predefined period of time in which users 101 may submit encrypted votes 253 and have them be considered. For example, an eligibility period 259 could specify that voters may submit votes on a specific day or specific set of days, or during specific hours on a particular day, etc.

The voter registration application 209 is implemented with computer executable code (in some embodiments) and executed to facilitate the registration of users 101 (FIG. 1) and client devices 103 for voting in future surveys, polls, elections, referendums, or other formal or informal group decision making process. The voter registration application 209 may receive information supplied by a user 101 and determine the eligibility status 233 of a user 101 to vote in a particular matter based at least in part on the information supplied by the user 101. The voter registration application 209 may also configure one or more authentication factors 239 on behalf of a user 101 and provide one or more of the authentication factors 239 to the client device 103 to facilitate future authentication of the user 101 when the user 101 attempts to submit an encrypted vote 253 in a matter.

The vote collection application 213 is implemented with computer executable code (in some embodiments) and executed to collect and verify encrypted votes 253 from users 101 submitted with client devices 103. For each encrypted vote 253 received, the vote collection application 213 may verify that the encrypted vote 253 is from an authorized or eligible user 101, that the encrypted vote 253 of the user 101 has not been altered by a third-party, and that the user 101 is not attempting to submit more than one encrypted vote 253. Once an encrypted vote 253 of a user 101 is verified or validated, the vote collection application 213 may then store the encrypted vote 253 in an anonymized manner in the data store 219. In some implementations, the vote collection application 213 could also store the encrypted vote 253 in a distributed ledger, such as a blockchain, for audit and accountability purposes.

The tabulation application 216 is implemented with computer executable code (in some embodiments) and executed to tally individual encrypted votes 253 for a particular matter to determine a result. In some implementations, the tabulation application 216 may also publish or otherwise report the results of a matter. For example, the tabulation application 216 sends the results to another application or service, records the results in a distributed ledger (e.g., a blockchain), or generates a network page listing the results.

The client device 103 is representative of a plurality of client devices that may be coupled to the network 206. The client device 103 may include, for example, a processor-based system such as a computer system. Such a computer system may be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability.

A client device 103 may be controlled using various user interfaces. For example, the client device 103 may include one or more displays 106, such as liquid crystal displays (LCDs), gas plasma-based flat panel displays, organic light emitting diode (OLED) displays, electrophoretic ink ("E-ink") displays, projectors, or other types of display devices. In some instances, the display 106 may be a component of the client device 103 or may be connected to the client device 103 through a wired or wireless connection. A graphical user interface 109 may be rendered on ore more of the displays 106. Other client devices 103 may include a microphone and one or more speakers, allowing a user to interact with the client device 103 by speaking natural language or structure commands that are recorded by the microphone. The client device 103 may then perform one or more actions in response to the voice command and provide auditory feedback through the speakers.

The client device 103 may be configured to execute various applications such as a client application 263 or other applications. The client application 263 may be executed in a client device 103, for example, to access network content served up by the computing environment 203 or other servers, thereby rendering a graphical user interface 109 on the display 106. To this end, the client application 263 may include, for example, a browser, a dedicated application, or other executable, and the graphical user interface 109 may include a network page, an application screen, or other user mechanism for obtaining user input. The client device 103 may be configured to execute applications beyond the client application 263, such as, for example, email applications, social networking applications, word processors, spreadsheets, or other applications.

In addition, there may also be a commissioning computing environment 266 in data communication with the client device 103 and the computing environment 203. The commissioning computing environment 266 may be operated by a party that is commissioning, managing, supervising, organizing, hosting, overseeing or otherwise in control of an election, a poll, a survey, or similar selection process.

The commissioning computing environment 266 may host a commissioning data store 269 that is accessible to the commissioning computing environment 266. The commissioning data store 269 may be representative of a plurality of commissioning data store 269, which may include relational databases, object-oriented databases, hierarchical databases, hash tables or similar key-value data stores, as well as other data storage applications or data structures. The data stored in the commissioning data store 269 is associated with the operation of the various applications or functional entities described herein. This data may include portions of voter records 223, and election records 229, and potentially other data.

Like the computing environment 203, the commissioning computing environment 266 may include, for example, a server computer or any other system providing computing capability. Alternatively, the commissioning computing environment 266 may employ a plurality of computing devices that may be arranged, for example, in one or more server banks or computer banks or other arrangements. Such computing devices may be located in a single installation or may be distributed among many different geographical locations. For example, the commissioning computing environment 266 may include a plurality of computing devices that together may include a hosted computing resource, a grid computing resource or any other distributed computing arrangement. In some cases, the commissioning computing environment 266 may correspond to an elastic computing resource where the allotted capacity of processing, network, storage, or other computing-related resources may vary over time.

Although the commissioning computing environment 266 and the commissioning data store 269 are depicted separately from the computing environment 203 and the data store 219, the functions of the computing environment 203 and the commissioning computing environment 266 may be implemented within a single computing environment operated by a common provider. For example, a data center or other service provider may provide computing and storage resources to multiple clients. As a result, the operator of the applications and data hosted by the computing environment 203 and the operator of the applications and data hosted by the commissioning computing environment 266 could in fact be hosted in the same physical or logical data center or environment.

Next, a general description of the operation of the various components of the networked environment 200 is provided. More detailed descriptions regarding particular components of the networked environment 200 accompany the discussion of subsequent figures.

To begin, an entity that wishes to utilize electronic voting for an election, poll, survey, or other selection process configures the voter registration application 209, vote collection application 213, and the tabulation application 216. For example, the entity may use an administrative interface to upload voter records 223 and election records 229 from the commissioning data store 269 hosted by the commissioning computing environment 266 to the data store 219 hosted by the computing environment 203. The entity may also use such an administrative interface to configure various options related to the operation of the voter registration application 209, vote collection application 213, and the tabulation application 216. Such options could include the number or type of authentication factors 239 required for voters to electronically vote, whether or not to publish votes to a distributed public ledger, whether voters are required to provide biometric data 239 when voting electronically or the type(s) of biometric data 239 a voter is required to submit, and potentially other options.

Later, a user 101 of a client device 103 attempts to register himself or herself or his or her client device 103 with the voter registration application 213. As part of the registration process, the user may submit through a graphical user interface 109 provided by a client application 263 voter identification data 236 or biometric data 239. As a simple example, a user could submit his or her full legal name and date of birth. In instances where additional security is required, the user 101 could also submit a fingerprint. For example, a fingerprint scanner included in the client device 103 could be used to capture the fingerprint of a user 101 for submission to the voter registration application 209.

The inclusion of biometric data 239 allows for the voter registration application 209 to confirm that the individual using the client device 103 is in fact the user 101 instead of another individual impersonating the user 101. Other voter identification data 236 or biometric data 239 could also be collected by the client application 263 and submitted to the voter registration application 209 in various embodiments. For example, facial recognition data or the current residential address or mailing address of the user 101 could also be supplied to provide additional certainty to the authentication process.

Next, the voter registration application 209 confirms that the user 101 is an eligible voter. For example, the voter registration application 209 may confirm that the voter identification data 236 or biometric data 239 received from the client application 263 matches the voter identification data 236 or biometric data 239 stored in a voter record 223 in the data store 219. If the information matches, the voter registration application 209 may determine that the user 101 is eligible to use the vote collection application 213 to submit encrypted votes 253.

The voter registration application 209 may then configure one or more authentication factors 239 on behalf of the user 101. For example, the voter registration application 209 may generate an access token and provide the access token to the client application 263. The access token may be provided by the client application 263 in subsequent interactions with applications executing in the computing environment 203 to show that the user 101 has been authenticated with the voter registration application 209. As another example, the voter registration application 209 may randomly generate an initial or default password and provide the password to the user 101. For example, the voter registration 209 could send an email or a short message service (SMS) message containing the generated password to the user 101. Similarly, the voter registration application 209 could send the password to the client application 263, which could in turn render the password within the graphical user interface 109 on the display 106 of the client device 103.

In implementations that use a password and an access token as authentication factors 239, the password could be used as a first authentication factor 246, and the access token could be used as a second authentication factor 246. In these implementations, a user 101 would have to supply the password to a vote collection application 213 to submit an encrypted vote 253. The user 101 would also have to use the client device 103 that the user previously used to register with the voter registration application 209 in order to have the client application submit the previously supplied access token. As a result, an individual who knew the password of the user 101 would be unable to cast an encrypted vote 253 on behalf of the user 101 without accessing the client device 103 of the user 101.

Other types of authentication factors 239 may also be used according to various embodiments of the present disclosure. For example, the voter registration application 209 could generate a seed value for time-limited one-time passwords (TOTP) or HMAC-based one-time passwords (HOTP) and provide the seed value to the user 101 or the client device 103 (e.g., to the client application 263 executing on the client device 103 or a third-party authentication application configured to generate TOTP or HOTP values). As another example, the voter registration application 209 could generate and issue a certificate to the client application 263 or client device 103 to use as an authentication factor 246. Likewise, the voter registration application 209 could generate a cryptographic value, key, or primitive to provide to the client application 263 or client device 103 for use in a subsequent challenge-response authentication. Moreover, any number of authentication factors 239 may be used in combination with any number of other authentication factors 239 to provide additional levels or layers of security.

After registration, the user 101 may cast a ballot or submit an encrypted vote 253 in a matter. For example, the user 101 may use the client application 263 to submit answers to a poll or survey to the vote collection application 213 or submit a vote or ballot in an election.

First, the user 101 uses the client application 263 to authenticate himself or herself with the vote collection application 213. For example, the user 101 may enter his or her name and a password, which the client application 263 submits to the vote collection application 213 along with a previously issued access token. However, the user may submit other or additional authentication factors 239 in various embodiments of the present disclosure. Likewise, the user 101 may also provide a fingerprint or face scan using a fingerprint reader or camera of the client device 103.

The vote collection application 213 then verifies the user 101 by comparing the voter identification data 236, authentication factors 239, and/or biometric data 239 received from the client application 263 with the voter identification data 236, authentication factors 239, and/or biometric data 239 of a respective voter record 223 stored in the data store 219. If the information supplied by the client application 263 matches the information stored in a voter record 223 in the data store, the vote collection application 213 may determine that the user 101 is an authorized voter.

The user 101 may then submit a vote using the client application 263. For example, the client application 263 may retrieve a list of matters (e.g., surveys, polls, elections, or other matters) that the user 101 is eligible to cast a vote for. The user 101 then may select a matter in which to cast a vote and select his or her vote using the graphical user interface 109 generated by the client application 263. The client application 263 then may encrypt the vote of the user 101 using a homomorphic encryption system to generate an encrypted vote 253. The client application 263 then may submit the encrypted vote 253 to the vote collection application 213 along with an election identifier 249 specifying the matter for which the encrypted vote 253 is cast. The encrypted vote 253 may also be submitted along with additional authentication information to allow the vote collection application 213 to verify the integrity of the encrypted vote 253 upon receipt. Examples are described in further detail herein.

Once the election period 259 for the matter expires, the tabulation application 216 may tally the encrypted votes 253 submitted by various users 101 to determine an outcome of a matter. Because the encrypted votes 253 are homomorphically encrypted, the tabulation application 216 may tally the encrypted votes 253 to determine an outcome without decrypting the encrypted vote 253 itself to unmask a selection of a user 101. As an illustrative example, if two choices were available for a user 101 to select between when casting an encrypted vote 253, the first choice could be represented with the value of "−1," and the second choice could be represented with the value of "1." By summing all of the encrypted votes 253, one could determine whether the first choice or the second choice were the winner based on whether the result of summing all of the encrypted votes 253 were positive or negative. One could also determine the margin of victory by the magnitude of the result (e.g., a value of "−52" would indicate that the first choice won by 52 votes). An appropriate homomorphic encryption scheme may be used based on the requirements of a particular matter (e.g., number of options for a voter to choose from, etc.).

After the encrypted votes 253 for a matter have been tallied by the tabulation application 216, the tabulation application 216 may publish or otherwise make the results available. For example, the tabulation application 216 may publish the results to a distributed ledger, such as a blockchain. The tabulation application 216 may also publish the results through other approaches, such as a network page or providing the results to another application or service.

The tabulation application 216 may also publish individual encrypted votes 253 to the distributed ledger to provide for accountability and verifiability of the results. In some embodiments, individual encrypted votes 253 may be published to the distributed ledger by the vote collection application 213 as encrypted votes 253 are received. However, in other embodiments, individual encrypted votes 253 may be withheld from being published to a distributed ledger (e.g., a blockchain) until after an election period 259 has passed or ended in order to avoid influencing voting behavior for the matter.

Figure 3:
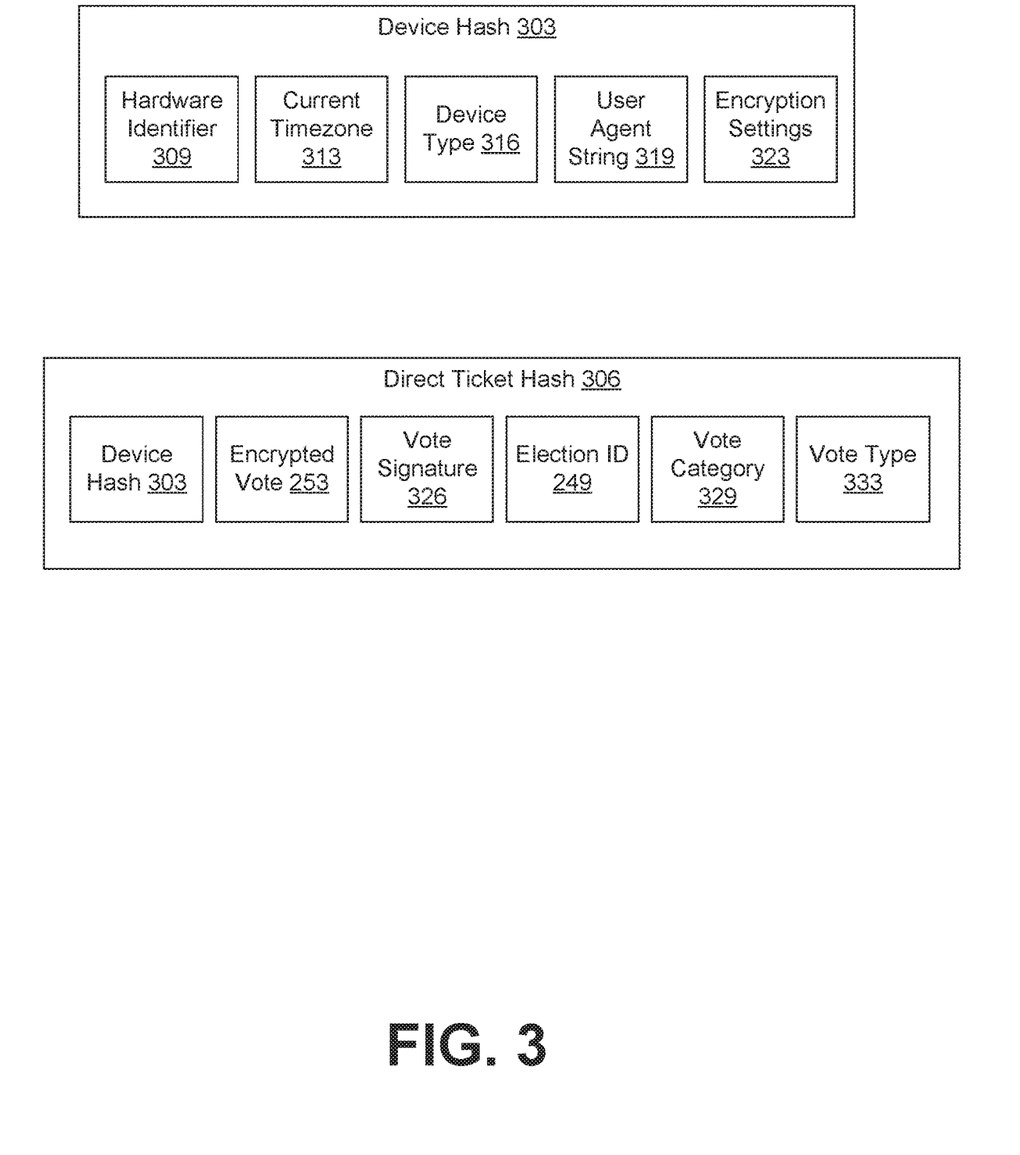
FIG. 3 is a pictorial diagram of data structures used during network communications between devices in the networked environment of FIG. 2 according to various embodiments of the present disclosure.

Referring next to FIG. 3, shown are illustrations of device hash 303 and a direct ticket hash 306. These data structures are used to communicate information between the client application 263 (FIG. 2) and one or more of the registration application 209 (FIG. 2) or the vote collection application 213 (FIG. 2). The data structures may be modified for specific embodiments of the present disclosure to include additional information to meet the demands of a particular embodiment or omit depict information that is extraneous to the demands of a specific embodiment.

The device hash 303 represents a cryptographically generated hash of a data related to or specifically identifying a client device 103 (FIG. 1). To generate the device hash 303, a number of factors are concatenated together into a larger string or value. This larger string or value is then submitted to a cryptographic hash function to generate a cryptographically unique hash value that serves as the device hash 303 for a particular client device 103. The device hash 303 may be generated by the client device 103 and submitted to the voter registration application 209 or the vote collection application 213 to authenticate the client device 103, as further described herein.

The device hash 303 may be generated from a number of factors. For example, the device hash 303 may be based at least in part on a hardware identifier 309 of a client device 103, such as a media access control (MAC) address of a network interface of the client device 103, an International Mobile Equipment Identity (IMEI) number, a hardware or device manufacturer serial number, or other similar unique identifier. The device hash 303 may also be based at least in part on the current timezone 313, which represents the current timezone (e.g., Greenwich Mean Time, Central European Time, Eastern Standard Time, Pacific Standard Time, etc.) for which the client device 103 is configured. The device hash 303 may also be based at least in part on the device type 316, which represents the type of the client device 103 (e.g., smartphone, tablet, personal computer, etc.).

The device hash 303 may also be based at least in part on the user-agent string 319, which represents a character text string submitted by the client application 263 to one or more of the voter registration application 209 or the vote collection application 213. The device hash 303 may also be based at least in part on the user-agent string 319, which may include an identification of the client application 263 type (e.g., browser type and version or application type and version), a version of the operating system installed on the client device 103, the current location or current timezone 313 of the client device 103, and potentially other information. The device hash 303 may also be based at least in part on one or more encryption settings 323, which represent a collection of encryption algorithms (e.g., advanced encryption standard (AES), digital encryption standard (DES), triple digital encryption standard (3DES), TwoFish, etc.) and/or versions of encryption algorithms (e.g., AES with a 128-bit key versus AES with a 192-bit key or AES with a 256-bit key; whether a block encryption algorithm operates in electronic code book (ECB) mode, cipher block chaining (CBC) mode, cipher feedback (CFB) mode, output feedback (OFB) mode, counter (CTR) mode, Galois/Counter Mode (GCM), etc.).

While all of these factors are depicted as being included in the device hash 303, it should be noted that various embodiments of the present disclosure may use any subset of these factors. Likewise, some embodiments of the present disclosure may include additional information in the device hash 303 beyond what is depicted in FIG. 3 or previously described.

The direct ticket hash 306 represents a cryptographically generated hash of the information supplied by the client application 263 to the vote collection application 213 when a user 101 of the client device 103 is submitting a vote. To generate the direct ticket hash 306, a number of factors are concatenated together into a larger string or value. This larger string or value is then submitted to a cryptographic hash function to generate a cryptographically unique hash value that serves as the direct ticket hash 306 for votes of a user 101. The direct ticket hash 306 may be generated by the client device 103 and submitted to the vote collection application 213 to authenticate votes of a user 101, as further described herein.

The direct ticket hash 306 may be generated from various types of information, such as the device hash 303, a copy of the encrypted vote 253, a vote signature 326, an election identifier 249, a vote category 329, and a vote type 333. The vote signature 326 may represent a cryptographic hash of the encrypted vote 253 generated using various cryptographic hash algorithms. The vote category 329 may represent the type of matter for which the vote is being submitted (e.g., marketing survey, poll, government election, etc.). The vote type 333 may represent the type or category of vote being submitted (e.g., single candidate or option selection, straight ticket, etc.). While all of these components are depicted as being the basis for the direct ticket hash 306, it should be noted that various embodiments of the present disclosure may use any subset of the described information, and some embodiments may include additional information as a basis for the direct ticket hash 306 beyond what is described herein. For example, in some embodiments, a direct ticket hash 306 could be based on just the encrypted vote 253 and the vote signature 326. In other embodiments, the direct ticket hash 306 could be based at least in part on the device hash 303, the encrypted vote 253, the vote signature 326, and the election identifier 249.

Figure 4:
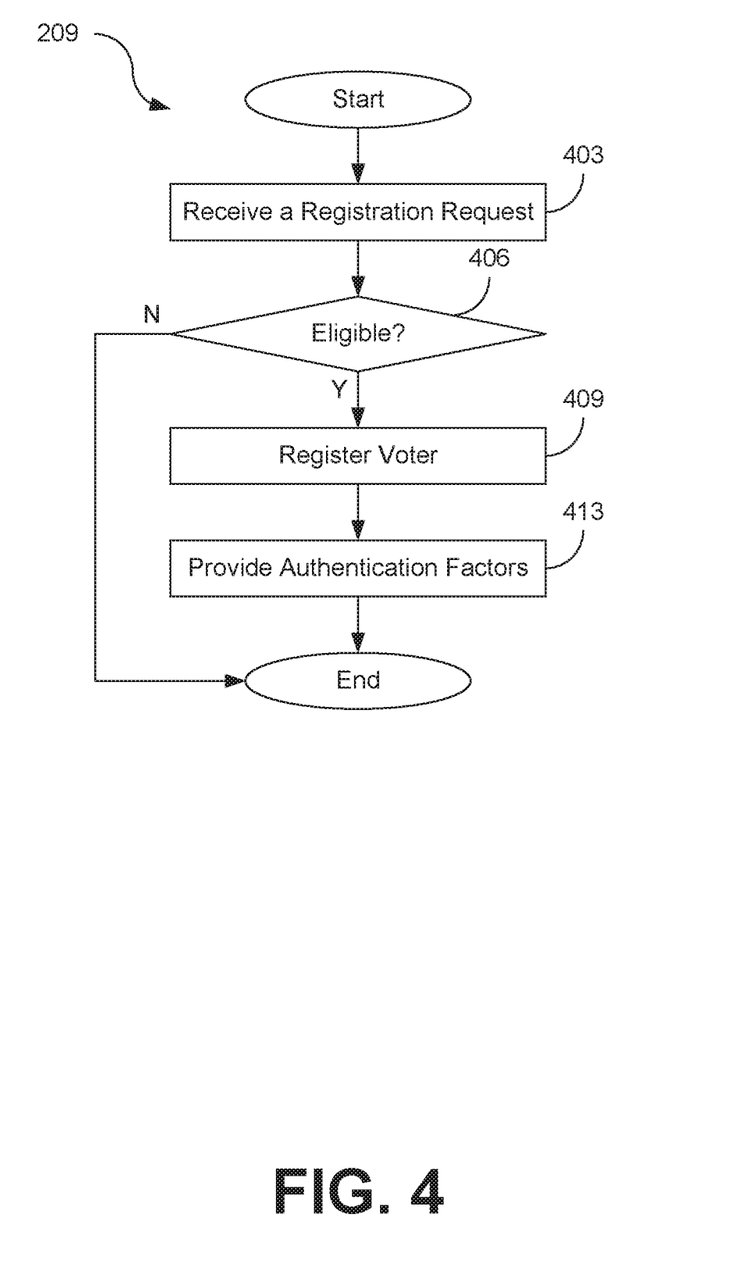
FIGS. 4-6 are flowcharts illustrating examples of functionality implemented as portions of an application executed in a computing environment in the networked environment of FIG. 2 according to various embodiments of the present disclosure.

Referring next to FIG. 4, shown is a flowchart that provides one example of the operation of a portion of the voter registration application 209 according to various embodiments. It is understood that the flowchart of FIG. 4 provides merely an example of the many different types of functional arrangements that may be employed to implement the operation of the portion of the voter registration application 209 as described herein. As an alternative, the flowchart of FIG. 4 may be viewed as depicting an example of elements of a method implemented in the computing environment 203 (FIG. 2) according to one or more embodiments.

Beginning with box 403, the voter registration application 209 receives a registration request from a client application 263 (FIG. 2) executing on the client device 103 (FIG. 2). The registration request may be sent by the client application 263 in order to configure the client device 103 for use by the user 101 for submitting votes in subsequent matters. The registration request may include voter identification data 236, biometric data 239, and potentially other information such as one or more election identifiers 249 for matters for which the user 101 wishes to submit a vote.

Then at box 406, the voter registration application 209 determines whether the user 101 is an eligible voter. For example, the voter registration application 209 may search for a voter record 223 that matches the voter identification data 236, the biometric data 239, and any other information provided by the client application 263. If a voter record 223 exists, the voter registration application 209 may check the eligibility status 233 for the user 101 for the election identifiers provided at box 403. If a voter record 223 does not exist, or the eligibility status 233 indicates that the user 101 is not eligible to participate in the matters specified by the election identifiers 249 received from the client application 263, then the process ends. In some instances, the voter registration application 209 may provide an error message in response indicating that the user 101 is ineligible to vote in the specified matters. However, if a voter record 223 exists and the user is eligible to vote in one or more of the specified matters, then the process proceeds to box 409.

Proceeding to box 409, the voter registration application 209 registers the user 101. For example, the voter registration application 209 may update the voter identification data 236 or the biometric data 239 stored in the voter record 223 to reflect additional information provided by the user 101 or updated information provided by the user 101. The voter registration application 209 can also generate or configure any necessary authentication factors 239 for the user 101 to submit votes in the future. For example, the voter registration application 209 may create an initial seed for use in generating one-time passwords (e.g., for use with TOTP or HOTP approaches). As another example, the voter registration application 209 may generate a default password or an access token on behalf of the user. Similarly, the voter registration application 209 may save a password supplied by the user 101 as an authentication factor 246.

Then at box 413, the voter registration application 209 provides any authentication factors 239 to the client application 263 that need to be presented to the user or stored by the client application 263 on the client device 103. For example, the voter registration application 209 may provide a default password or an initial seed for a one-time password to the client application 263, which the client application 263 may render in a graphical user interface 109 for presentation to the user 101. As another example, the voter registration application 209 may provide an access token to the client application 263 to store on the client device 103. The access token can be provided by the client application 263 to the vote collection application 213 when the user 101 is attempting to vote in order to authenticate the client device 103 and the user 101 with the vote collection application 213.

Figure 5:
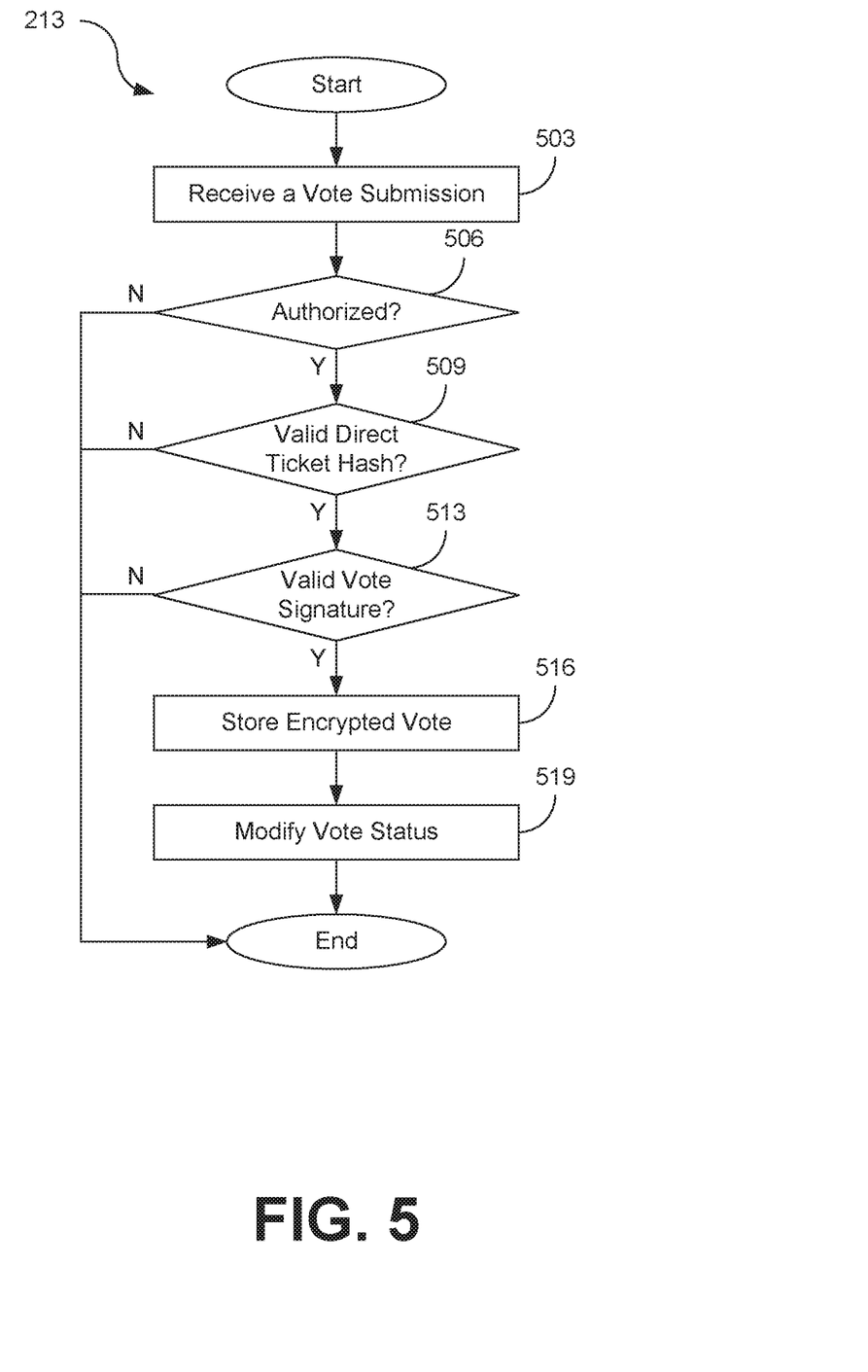

Referring next to FIG. 5, shown is a flowchart that provides one example of the operation of a portion of the vote collection application 213 according to various embodiments. It is understood that the flowchart of FIG. 5 provides merely an example of the many different types of functional arrangements that may be employed to implement the operation of the portion of the vote collection application 213 as described herein. As an alternative, the flowchart of FIG. 5 may be viewed as depicting an example of elements of a method implemented in the computing environment 203 (FIG. 2) according to one or more embodiments.

Beginning with box 503, the vote collection application 213 receives a vote submission from the client application 263 executing on the client device 103 of the user 101. The vote submission may include a number of items of information, such as a device hash 303 (FIG. 3), an encrypted vote 253 (FIG. 2), a vote signature 326 (FIG. 3), an election identifier 249 (FIG. 2), one or more authentication factors 239, or biometric data 239 (FIG. 2). Some embodiments of the present disclosure may include additional items of information or omit particular pieces of data according to the details of those embodiments.

Then at box 506, the vote collection application 213 determines whether the vote submission is from an authorized user 101. For example, the vote collection application 213 may compare the authentication factors 239 (e.g., access token, one-time password, user supplied password, etc.) received from the client application 263 at box 503 to the authentication factors 239 stored in a voter record 223 of a voter record 223 associated with the user 101. If each authentication factor 246 supplied by the client application 263 matches a respective authentication factor 246 stored in the voter record 223, then the vote collection application 213 may determine that the user 101 is authorized to submit a vote. Additionally, the vote collection application 213 may also evaluate the eligibility status 233 and the voter status 243 to determine whether the user 101 is eligible to submit a vote in the matter identified by the submitted election identifier 249 and has not already submitted a vote in the matter.

Assuming that the user 101 is eligible and has not previously submitted a vote, then the vote collection application 213 may continue to conclude that the user 101 is authorized to submit a vote. In some embodiments where security is paramount, biometric data 239 provided by the client application at box 503 may be compared to biometric data 239 in the voter record 223 for the user 101. If the biometric data 239 matches, the vote collection application 213 may continue to conclude that the individual that used the client application 263 to submit a vote is in fact the eligible, authorized user 101 instead of an imposter, impersonator, or other unauthorized or ineligible individual. If any of the authorization checks performed by the vote collection application 213 fail, then then the process ends without any vote being recorded. However, if the user is determined to be authorized to submit a vote, then the process continues to box 509.

Next at box 509, the vote collection application 213 verifies the direct ticket hash 306 received from the client application 263. For example, the vote collection application 213 may compute a second version of the direct ticket hash 306 using the information received from the client application 263 (e.g., the device hash 303, the encrypted vote 253, the vote signature 326, the election identifier 249, the vote category 329, the vote type 333, and/or potentially other data). If the second version of the direct ticket hash 306 matches the version of the direct ticket hash 306 received from the client application 263, then the vote collection application 213 can conclude that the information received from the client device 103 is valid and has not been altered. If the direct ticket hash 306 is determined to be valid, then the process may proceed to box 513. However, if the direct ticket hash 306 is determined to be invalid, then the process instead may end without any vote being recorded.

Proceeding to box 513, the vote collection application 213 may further verify that the encrypted vote 253 itself has not been altered. Accordingly, the vote collection application 213 may compute a vote signature 326 based on the encrypted vote 253 received from the client application 263. If the computed vote signature 326 matches the vote signature received from the client application 263, then the vote collection application 213 can determine that the encrypted vote 253 has not been altered. Accordingly, the process may continue to box 516. If the vote signatures 326 fail to match, however, then the process may end without any vote being recorded.

Then at box 516, the vote collection application 213 may store the encrypted vote 253 in an election record 229. In some instances, the vote signature 326 may also be stored in the election record 229 in association with the encrypted vote 253 in order for independent parties to verify the authenticity of the encrypted vote 253. To preserve voter anonymity, the vote collection application 213 may store the encrypted vote 253 without any link or association to a specific voter record 223. In some implementations, the vote collection application may simultaneously publish the encrypted vote 253 and the vote signatures 326 to a distributed ledger, such as a block chain.

In some instances, the vote collection application 213 may note the order in which the homomorphically encrypted votes 253 are received. The vote collection application 213 can then store the homomorphically encrypted votes 253 in an order different from the order in which the homomorphically encrypted votes 253 were received. For example, the vote collection application 213 may randomize the order in which the homomorphically encrypted votes 253 are stored. Storing the homomorphically encrypted votes 253 in an order different from the order in which the homomorphically encrypted votes 253 helps to preserve voter anonymity by preventing timing attacks, where a third-party might try to unmask or identify a voter's vote based on when the client device 103 for the voter submitted a homomorphically encrypted vote 253 and when the homomorphically encrypted vote 253 was stored by the vote collection application 213.

Subsequently at box 519, the vote collection application 213 modifies the vote status 243 of the voter record 223 of the user 101 to indicate that the user has submitted a vote in the matter identified by the election identifier 249 supplied by the client application 263. Modification of the vote status 243 allows for the vote collection application 213 to prevent individuals from submitting multiple votes in a matter. Once the vote status 243 of the user is modified, the process may end.

In some instances, the actions performed at box 519 may be performed atomically with those actions at performed at box 516. That is to say that modification of the vote status 243 may be configured to only occur in response to storage of the encrypted vote 253. This arrangement may be implemented in order to ensure that a vote status 243 is only altered in response to the encrypted vote 253 of a user 101 being recorded. If the operations were performed independently or in parallel, it would be possible that, due to a hardware failure or other incident, a user 101 might have his or her vote status 243 modified to indicate that he or she has voted without his or her vote being recorded.

Figure 6:
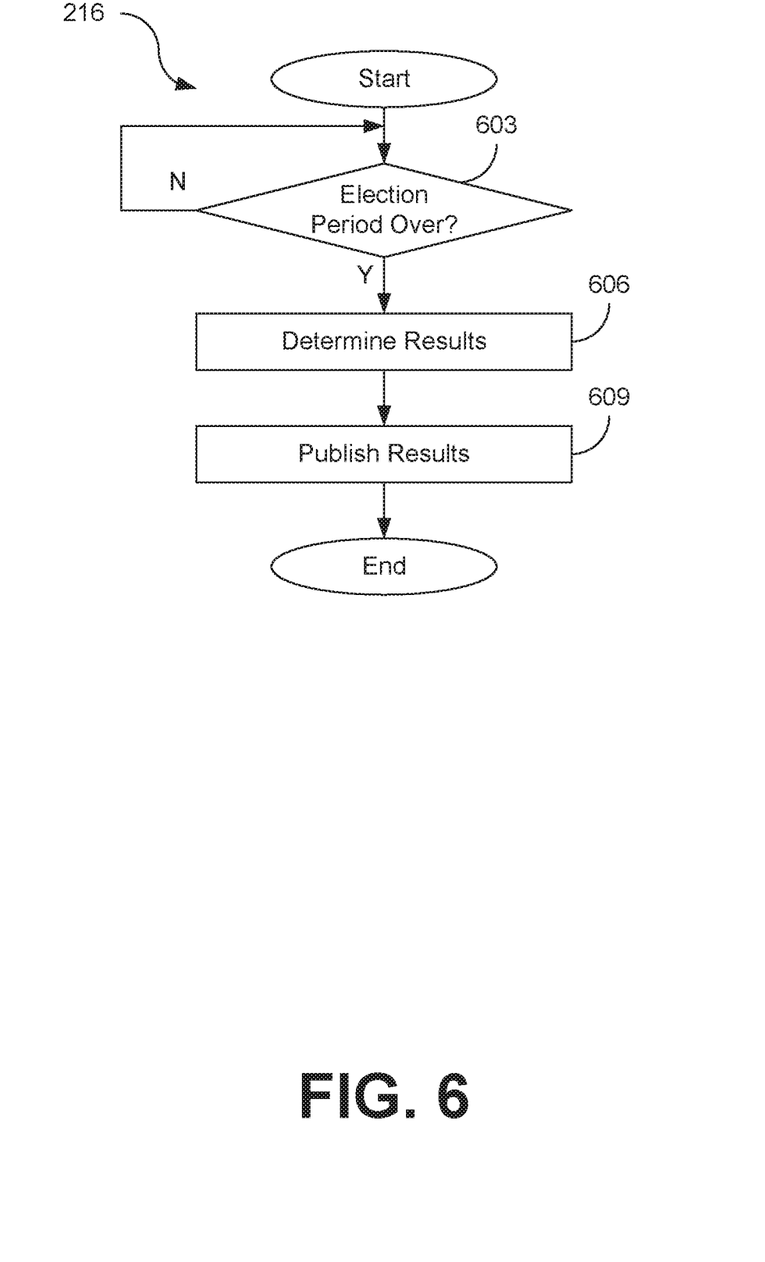

Referring next to FIG. 6, shown is a flowchart that provides one example of the operation of a portion of the tabulation application 216 according to various embodiments. It is understood that the flowchart of FIG. 6 provides merely an example of the many different types of functional arrangements that may be employed to implement the operation of the portion of the tabulation application 216 as described herein. As an alternative, the flowchart of FIG. 6 may be viewed as depicting an example of elements of a method implemented in the computing environment 203 (FIG. 2) according to one or more embodiments.

Beginning with box 603, tabulation application 216 continuously or periodically checks to determine whether an election period 259 (FIG. 2) specified in an election record 229 (FIG. 2) for a particular matter is over or has otherwise expired or passed. For example, the tabulation application 216 may periodically or continuously check the termination date and time specified in the election period 259 with the current date and time. Once the election period 259 is determined to have expired, the tabulation application 216 proceeds to box 606.

Then at box 606, tabulation application 216 determines the results of a survey, poll, election, or similar formal decision making process. For example, the tabulation application 216 may identify the vote records 226 with an election identifier 249 matching the election identifier 249 of the current matter. The tabulation application 216 may then tabulate or otherwise sum the individual encrypted votes 253 (e.g., by performing homomorphic encryption operations) to determine an outcome.

Subsequently at box 609, the tabulation application 216 publishes the results or outcome previously determined at box 606. For example, the tabulation application 216 may make available the total result and the individual encrypted votes 253 and respective vote signatures 326 on a network page. As another example, the tabulation application 216 may make the total result, the individual encrypted votes 253, and respective vote signatures 326 available to another application (e.g., as part of a data feed or in response to a request for the data). Similarly, the tabulation application 216 may store the total result and the individual encrypted votes 253 and respective vote signatures 326 on a distributed ledger such as a blockchain. Once the results are published, the process ends.

Figure 7:
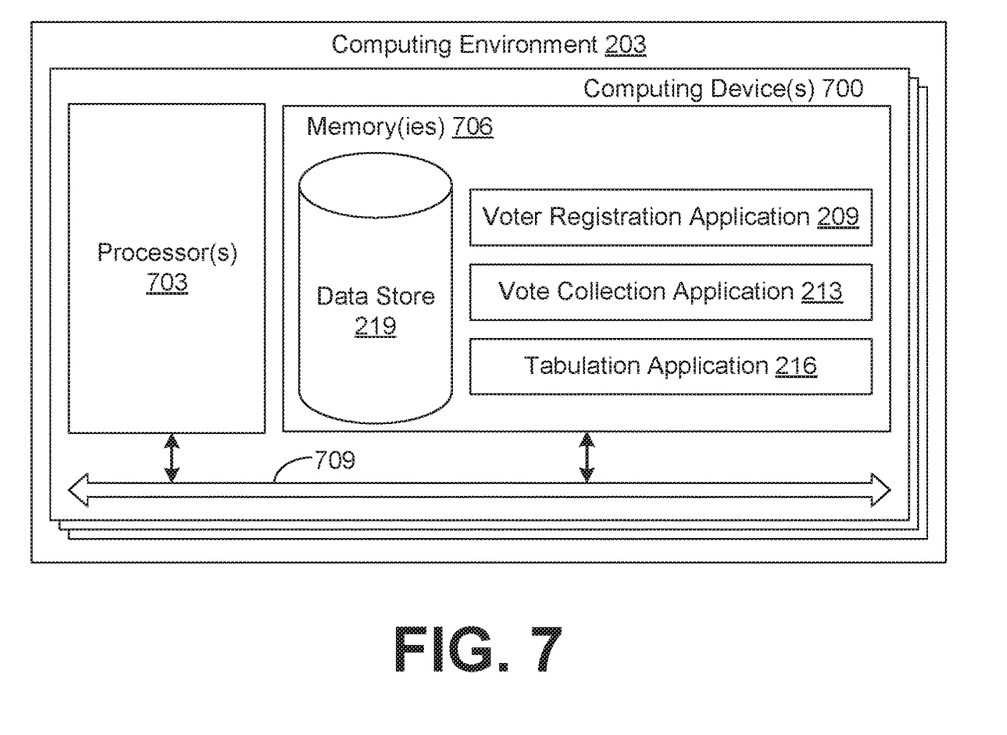
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may include, for example, at least one server computer or like device. The local interface 709 may include, for example, a data bus with an accompanying address/control bus or other bus structure as may be appreciated.

Stored in the memory 706 are both data and several components that are executable by the processor 703. In particular, stored in the memory 706 and executable by the processor 703 are the voter registration application 209, the vote collection application 213, and the tabulation application 216, and potentially other applications. Also stored in the memory 706 may be a data store 219 and other data. In addition, an operating system may be stored in the memory 706 and executable by the processor 703.

It is understood that there may be other applications that are stored in the memory 706 and are executable by the processor 703 as may be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that may ultimately be run by the processor 703. Examples of executable programs may be, for example, a compiled program that may be translated into machine code in a format that may be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 703 may represent multiple processors 703 or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706. The local interface 709 may include additional systems designed to coordinate this communication, including, for example, performing load balancing. The processor 703 may be of electrical or of some other available construction.

Although the voter registration application 209, the vote collection application 213, and the tabulation application 216, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of the voter registration application 209, the vote collection application 213, and/or the tabulation application 216. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 703 in a computer system or other system. The machine code may be converted from the source code through various processes. For example, the machine code may be generated from the source code with a compiler prior to execution of the corresponding application. As another example, the machine code may be generated from the source code concurrently with execution with an interpreter. Other approaches may also be used. If embodied in hardware, each block may represent a circuit or a number of interconnected circuits to implement the specified logical function or functions.

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the voter registration application 209, the vote collection application 213, and the tabulation application 216, that includes software or code may be embodied in any non-transitory computer-readable medium for use by or in connection with an instruction execution system such as, for example, a processor 703 in a computer system or other system. In this sense, the logic may include, for example, statements including instructions and declarations that may be fetched from the computer-readable medium and executed by the instruction execution system. In the context of the present disclosure, a "computer-readable medium" may be any medium that may contain, store, or maintain the logic or application described herein for use by or in connection with the instruction execution system.

The computer-readable medium may include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the voter registration application 209, the vote collection application 213, and the tabulation application 216, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine readable instructions stored in the memory that, when executed by the processor, cause the computing device to at least:
   receive, from a client device, a direct ticket and a direct ticket hash, the direct ticket comprising a device hash of the client device, a ciphertext representation of a vote, and a first digital signature of the ciphertext representation of the vote;
   verify the direct ticket based at least in part on the direct ticket hash;
   compute a second digital signature for the ciphertext representation of the vote;

validate the ciphertext representation of the vote based at least in part on a determination that the first digital signature matches the second digital signature;

store the ciphertext representation of the vote in a data store in response to a validation of the ciphertext representation of the vote;

update a blockchain to include the ciphertext representation of the vote in response to the validation of the ciphertext representation of the vote; and update a state of a user account associated with the vote to indicate that a user associated with the user account has submitted a vote in response to a storage of the ciphertext representation of the vote in the data store and an update to the blockchain.

2. The system of claim 1, wherein the machine readable instructions, when executed by the processor, further cause the computing device to at least:

determine that a period of time for voting has concluded; and tally a plurality of ciphertext representations of votes stored in the data store.

3. The system of claim 1, wherein the machine readable instructions, when executed by the processor, further cause the computing device to at least:

receive from the client device a registration request to vote;

confirm eligibility of a user account associated with the client device to cast the vote;

generate an access token; and provide the access token to the client device.

4. The system of claim 1, wherein the machine readable instructions, when executed by the processor, further cause the computing device to at least:

authenticate a user account associated with the client device; and verify that the user account is permitted to submit the ciphertext representation of the vote.

5. A system, comprising:

a computing device comprising a processor and a memory; and machine readable instructions stored in the memory that, when executed by the processor, cause the computing device to at least:

receive, from a client device, a homomorphically encrypted vote, a digital signature of the homomorphically encrypted vote, biometric information of a user of the client device, and an access token;

verify that the biometric information of the user of the client device matches previously received biometric information of an eligible voter;

verify that the access token matches a previously issued access token issued to the eligible voter;

validate the digital signature of the homomorphically encrypted vote;

store the homomorphically encrypted vote in a data store; and in response to storage of the homomorphically encrypted vote in the data store, update a status of the eligible voter to indicate that the eligible voter has submitted a vote.

6. The system of claim 5, wherein the machine readable instructions further cause the computing device to at least publish the homomorphically encrypted vote to a distributed ledger.

7. The system of claim 6, wherein the distributed ledger is a blockchain.

8. The system of claim 5, wherein a homomorphically encrypted vote is stored in association with a plurality of homomorphically encrypted votes and the machine readable instructions further cause the computing device to at least:

tally the plurality of homomorphically encrypted votes to determine a result of the plurality of homomorphically encrypted votes; and publish the result of the homomorphically encrypted votes to a feed.

9. The system of claim 5, wherein the access token is a first factor of authentication for the eligible voter, and the machine readable instructions further cause the computing device to at least receive from the client device a second factor of authentication for the eligible voter.

10. The system of claim 9, wherein the second factor of authentication comprises an alphanumeric code that is valid for a predefined period of time.

11. The system of claim 5, wherein the machine readable instructions further cause the computing device to at least:

receive a device hash and a direct ticket hash, the device hash representing the client device and the direct ticket hash representing a combination of at least the device hash, the homomorphically encrypted vote, and the digital signature of the homomorphically encrypted vote;

validate the combination of the device hash, the homomorphically encrypted vote, and the digital signature of the homomorphically encrypted vote based at least in part on the direct ticket hash;

verify that the client device is a previously authorized client device based at least in part on the device hash; and wherein the homomorphically encrypted vote is stored in the data store in response to:

a validation of the combination of at least the device hash, the homomorphically encrypted vote, and the digital signature of the homomorphically encrypted vote; and a verification that the client device has been previously authorized.

12. The system of claim 5, wherein the machine readable instructions further cause the computing device to at least:

receive a registration request from the client device;

confirm that the client device is associated with the eligible voter; and send the access token to the client device in response to a confirmation that the client device is association with the eligible voter.

13. A method, comprising:

receiving from a client device associated with an eligible voter, via at least one of one or more computing devices, a homomorphically encrypted vote, a digital signature of the homomorphically encrypted vote, and an access token;

validating, via at least one of the one or more computing devices, the digital signature of the homomorphically encrypted vote;

verifying, via at least one of the one or more computing devices, that the access token matches a previously issued access token previously issued to the eligible voter;

storing, via at least one of the one or more computing devices, the homomorphically encrypted vote in a data store in response to validating the digital signature of the homomorphically encrypted vote and verifying that the access token matches the previously issued access token; and recording, via at least one of the one or more computing devices, the homomorphically encrypted vote in a publicly available distributed ledger;

in response to storage of the homomorphically encrypted vote in the publicly available distributed ledger, update a status of the eligible voter to indicate that the eligible voter has submitted a vote.

14. The method of claim 13, further comprising:

receiving, via at least one of the one or more computing devices, at least two factors of authentication from the client device;

verifying, via at least one of the one or more computing devices, that user of the client device is an eligible voter based at least in part on the at least two factors of authentication; and wherein storing the homomorphically encrypted vote in the data store and recording the homomorphically encrypted vote in the publicly available distributed ledger occur in response to verifying that the user of the client device is the eligible voter.

15. The method of claim 14, further comprising updating, via at least one of the one or more computing devices, a status of the eligible voter to indicate that the eligible voter has submitted a vote in response to storing the homomorphically encrypted vote in the data store.

16. The method of claim 13, further comprising:

receiving, via at least one of the one or more computing devices, a device hash from the client device; and verifying, via at least one of the one or more computing devices, that the client device is an authorized client device for submitting the homomorphically encrypted vote.

17. The method of claim 16, wherein the device hash is based at least in part on a unique hardware identifier of the client device.

18. The method of claim 16, wherein the device hash is based at least in part on a type of the client device.

19. The method of claim 13, further comprising:

determining, via at least one of the one or more computing devices, that a period for receiving votes has concluded; and tallying, via at least one of the one or more computing devices, a plurality of homomorphically encrypted votes that include the homomorphically encrypted vote received from the client device.

20. The method of claim 13, wherein:

the homomorphically encrypted vote is one of a plurality of homomorphically encrypted votes received from respective ones of a plurality of client devices; and storing, via at least one of the one or more computing devices, the homomorphically encrypted vote in the data store in response to validating the digital signature of the homomorphically encrypted vote further comprises:

reordering the plurality of homomorphically encrypted votes in a randomized manner; and storing the homomorphically encrypted vote based at least in part on the reordering of the plurality of homomorphically encrypted votes.

* * * * *